3,472,644
FOAMED SYNTHETIC POLYMERIC PLANT
GROWTH MEDIUM CONTAINING AN IN-
ORGANIC FILLER AND MICROORGANISMS
Roy Woodside, Houston, Tex., and Charles A. Zamzow, deceased, late of Houston, Tex., by Mrs. Charles A. Zamzov, community survivor, Houston, Tex., assignors, by direct and mesne assignments, to Perlite Producers, Inc., Midland, Tex., a corporation of Texas
No Drawing. Filed May 26, 1965, Ser. No. 459,123
Int. Cl. A01g *31/00;* C05g *3/00;* C05f *11/08*
U.S. Cl. 71—1                                                      8 Claims

ABSTRACT OF THE DISCLOSURE

A plant growth medium suitable for use as a matrix material to support the root structure of a living plant comprising a foamed synthetic polymeric material impregnated with finely divided particles of mineral ore and microorganisms suitable for rendering the ore adaptable for plant use and which may additionally contain a seaweed concentrate for supplying additional vitamins and minerals to said plant.

---

This invention relates to impregnated flexible cellular synthetic polymeric materials and to methods of preparing such materials. More particularly, this invention relates to the impregnation of a flexible cellular synthetic polymeric material with a solid predominantly inorganic material.

In recent years, there has been a great deal of development in the arts of cellular synthetic polymeric material— or simply "cellular plastics" of "foam plastics." One of the developments in this art has been the incorporation of filler materials in the cellular plastics.

This invention seeks to provide an improved cellular plastic material which has incorporated therein a filler material of a certain type.

This invention further seeks to provide methods by which a solid filler material may be incorporated into a flexible cellular plastic material.

It is also an object of this invention to provide a number of improved cellular plastic products, including especially a material which is useful as an artificial plant growth medium. The present invention also seeks to provide methods for making such a plant growth medium.

In accordance with this invention, these and other objects may be accomplished by preferred embodiments of the invention, which are explained below in detail.

Briefly, the invention comprises the incorporation of a solid filler into a flexible cellular plastic material.

Cellular plastic materials which are useful in accordance with this invention are those unicellular foams having a cell structure which is uniform and interconnecting. The foamed plastic chosen should be dielectric, and must have a good "loading" characteristic. By good loading characteristic is meant that the foam must be capable of accepting the required quantities of the filler material used with substantially uniform distribution of the filler. Particular foams which have been found useful in accordance with this invention are vinyl foam (polyvinyl chloride), foam rubber (latex), polyethylene foam, and the polyurethane foams. Particularly useful and preferred are the polyether and polyester-base polyurethane foams. Especially for use as a plant growth medium, the polyether-based polyurethane is preferred.

The solid filler used in accordance with this invention is an inorganic material which is derived from a mineral ore. The ore must be one which is capable of being expanded or "activated" to become a highly porous bloated material. Ores of the vermiculite or biotite type may be used. Biotite is a natural aluminum silicate of potassium, magnesium, and iron, belonging to the mica group. Its chemical formula may be written $$K(Mg,Fe)_3AlSi_3O_{10}(OH)_2$$

Biotite commonly occurs in some igneous and metamorphic rocks; it has a hardness of 2.5–3 and a sepecific gravity of 2.8–3.2, and is black, dark brown or dark green. Vermiculite is a micaceous mineral similar to biotite but hydrated, and with the property of expanding six to twenty times the volume of the unexpanded mineral when heated to about 2000° C. It is a hydrated magnesium-aluminum-iron silicate containing approximately 39% $SiO_2$, 21% $MgO$, 15% $Al_2O_3$, 9% $Fe_2O_3$, 5–7%, $K_2O$, 1% $CaO$, 5–9% $H_2O$, and small quantities of chromium, manganese, phosphorus, sulfur and chlorine. It is known to occur in Montana, Colorado, Wyomin, the Carolinas, and South Africa. Among its properties: platelet-type crystalline structure, high porosity, high void volume to surface area ratio, low density, relative chemical inertness, large range of particle size, insoluble in water and organic solvents, water vapor adsorption capacity less than 1%, liquid adsorption ranges from 200–500%. The ore preferred by applicants is an ore comprising silicon dioxide, ferric oxide, aluminum oxide, calcium oxide, magnesium oxide, and trace elements; the particular ore found to be most useful is sold under the trademark "Micolite." This particular ore is processed from mineral deposits near Llano, Texas. This raw ore has a density of about 100 lbs./ft.[3] before processing and about 18 to 24 pounds per cubic foot after processing. The processed material will absorb about 60 percent of its total bulk in moisture, and has a low K value. By K value is meant the thermal conductivity, which is defined as the quantity of heat passing in a unit of time through a plate of unit area and unit thickness, with a temperature differential of one degree between the faces of the plate. Another ore, perlite, has also been found useful in some embodiments of this invention. Perlite is a glassy volcanic rock material. It usually contains about 65%–75% $SiO_2$, 10–20% $Al_2O_3$, 2%–5% $H_2O$, and smaller amounts of soda, potash, and lime; perlite is known to occur in California, Colorado, New Mexico, Nevada, and Oregon. It is generally useful in this invention in combination with another ore, e.g. Micolite, and since it has a great capacity for storing water, it is normally employed when the product of the invention is to be used as a plant growth medium for water loving plants.

The raw ore is transformed into a material suitable for use as a filler by treatment which includes drying and expanding the ore. This drying and treatment of the ore results in reduced bulk density and greatly increased pore structures. For instance, the ore is dried, and then it is treated in such a manner to remove organic matter and to cause the ore to expand or bloat. This latter process is known as activation. The cell-like structure thus formed by the treatment of the ore is a porous filler material.

In accordance with the process of this invention, a mineral ore such as that described above is activated in an oxygen-fed furnace at temperatures of from 1000° F.– 2000° F. The material need remain in the furnace only a short period of time, for instance about 30 seconds, 3 minutes. This activation eliminates organic material from the ore, reduces the bulk density, and—most important— creates a pore structure in each mineral particle. The highly porous filler material is then screened to the desired size particles, particles of about 40 mesh and finer being preferred, particles in this size range resulting in greater uniformity, more even distribution, and greater reproducibility. Before activating the ore, it is preferable that the raw ore be first crushed, screened and dried.

The activated filler is then loaded into the cellular plastic material by either of the following methods: The filler may be weighed and thoroughly mixed with a prepolymer (of, for instance, polyether-based polyurethane) under controlled conditions of temperature (about 35–70° F.) and humidity (about 20–50%) and the mixture continually agitated. It will be recognized that if the temperature is too high, premature generation of gas may result and, likewise, high humidity may prematurely start the reaction. And it will also be recognized that the allowable temperature will also depend to some extent on the humidity conditions. The pre-weighed mixture is then metered into a mixing nozzle (any suitable mixer may be used, for example a Newton-type mixing machine) where it is blended with a pre-weighed and predetermined amount of catalyst and heated to about 90–120° F. The catalyst is preferably a mixture of an amine and water, though it is possible that an alcohol and water or carboxylic acid and water catalyst or any combination thereof, might be used. About 1.5 to 2.5 parts of catalyst are employed per 100 parts prepolymer. Alternately, the filler material may first be weighed and thoroughly mixed with the catalyst rather than the prepolymer. The prepolymer is metered into the filler-catalyst mixture in essentially the same manner as described above, and heated to about 90–120° F.

In either case, the blended mixture is allowed to flow into a mold which has been preheated to about 120° F. At a pressure of one atmosphere up to about 10 atmospheres, the material is molded to suitable shape, the cell structure and density of the resulting product depending on the exact pressure used. Either open-type or closed-type molds may be used, but the closed-type molds are greatly preferred. As will be understood by those skilled in the art, a mold release agent, such as polyethylene or Teflon (a tetrafluoroethylene polymer), is preferably used and the mold used should have in its outer perimeter properly placed and sized gas-release holes.

Upon release from the mold, it is desirable to post-cure the material. Among conditions found to be suitable for post-curing are these:

250° F. for 3 hours;
160° F. for 6 hours;
120° F. for 24 hours;
ambient temperature for about 2 weeks.

If the material is to be used as a plant-growth medium and has bacteria therein, then it should not be post-cured above about 180° F. so that the bacteria will not be killed.

While various ratios of prepolymer to filler and filler to catalyst might be used, best results have been obtained with a ratio of prepolymer to filler of about 11 to 1 by weight. Depending upon the type of prepolymer used, and the proposed use for the ultimate foam product, the filler may be incorporated in amounts ranging from 5%–75% by weight based upon the total weight of prepolymer, filler and catalyst. For a plant growth medium, the ratio of prepolymer to filler should not normally be less than 2.5 to 1.

When the product of this invention is desired to be used as a plant growth medium, it is often desirable to add, in addition to the filler above described, a bacterial agent to further sustain plant growth. The agent used should be one which will biochemically attack the minerals in the filler to render them adaptable to be used by the plants, in much the same way as the enzymes in the human stomach attack food to render it digestable. "Bacterial agent" is used here to include the microorganisms mold, fungus, and bacteria, and intermediaries thereof.

The bacterial agent may be added to the dry, screened, filler material before the latter is mixed with prepolymer or catalyst. For this purpose an inactive, cultured bacteria such as Fertosan Myco, has been found to be particularly advantageous. This product includes as its active ingredients the following types of microorganisms, all of which function to give a desired action: zygomcetes (a fungus) basidomycetes (a fungus), fungi imperfecti (a mold). ascomycetes and actinomycetes (intermediaries between fungus and bacteria which in this context usually act as bacteria), and nitrogen fixing bacteria of the denitrificans group.

It has also been found particularly desirable and advantageous to incorporate into the bacterial an additional plant growth agent such as Fertos compost concentrate, which is a concentrate of ascophyllum nodosum (seaweed) harvested from the Arctic Ocean near Norway. The concentrate contains some 60 trace elements, minerals, vitamins, the soil conditioner alginic acid, and the hormone "Indole Auxin" which stimulates germination, plant growth, and root development. About 16 parts by weight concentrate are used per one part bacterial agent. About one part bacterial agent plus concentrate is used for each 32,000 parts by weight of activated filler. This concentrate material also acts as a starter food for the bacteria, providing the plant with maximum nutrition from the beginning. The bacteria are in a state of suspended animation until activated; the bacteria are activated by soaking in pure warm water (approximately 110°–170° F.). One preferred method is to mix the bacteria first with a small amount of pure, chlorine-free (not distilled) warm (about 100° F.–170° F. water), and then mix this concentrate with a much larger quantity of pure warm water. Then the activated filler is placed in a large non-ferrous vessel and the bacteria solution added slowly and with agitation for at least 6 hours, about 12–24 hours being preferred. Here the bacteria begin to feed on the filler material. The vessel may then be closed and the pressure reduced while the temperature is maintained at about 100° F.–130° F., until most of the moisture is removed from the material (all but about 1%–12%). This process activates the bacteria and then leaves them in their dormant or deactivated state. It will be understood by those skilled in the art that it is necessary that bacteria be supplied with oxygen in the deactivated state, as for example by moisture. Since water will act as a catalyst to foam the prepolymer in accordance with this invention, it is necessary to determine the moisture content in order to know how much catalyst to use.

Instead of adding an excess of water and evaporating, another preferred method is to add the exact amount of moisture desired by means of an electronic proportional blender.

As a rule, bacteria are most active at temperatures above about 54° F. and below about 108° F. and will be killed by temperatures exceeding about 180° F. Accordingly, it is important to keep the plant growth medium fairly warm; in this regard, the low K value of both cellular plastic material and filler is critical when the product is to be used as a plant growth medium.

It is sometimes desired to use the product of this invention as a plant growth medium even if no bacterial agent has been added. In such cases, it is usually necessary to fertilize the plant periodically.

The product made in accordance with this invention has many advantageous uses. For instance, the product may be used as a plant growth medium (with or without the added bacteria), as a filter, as an abrasive cleaning sponge, as flooring, or as acoustical or thermal insulation. It will be recognized that the process of this invention may be varied in some details according to the ultimate use of the product. For instance, if it is desired to make acoustical insulation, a larger amount of filler may be incorporated into the foam than if the foam is to be used as a plant growth medium.

As a plant growth medium, the product of this invention is particularly advantageous. The roots of a plant grown in the material are protected from sudden temperature changes by the low K value of the material, and protected from invasion of foreign bodies which might be harmful to the plant. At the same time, the cells of the foam allow for maximum root growth and development. Since water is not retained in the greatest majority of the pores of the foam, but rather in the walls of the cells, the roots of the plants may reach up into the cell walls to absorb moisture when it is required, yet are not subjected to a water environment. For this reason, plants which are not hydroponic can survive for long periods of time in this product whereas they could not so survive in the products of prior art. Furthermore, the minerals available from the activated filler plus the bacteria and concentrate (if added) provide for a rich and long-lasting supply of plant food which is able to sustain a healthy plant for long periods of time with very little extra care (usually just periodic watering), which is believed to be in most cases in excess of several years. Of course if the roots of the plant grow through the plant growth media, it will be necessary to replace the plant in a greater supply of material.

The following examples are exemplary only of this invention, and should not be construed as a limitation in any way.

EXAMPLE 1

Ore processed and sold under the trademark Micolite was crushed, screened, and fed into a rotary dryer (approximately 24 r.p.m.), which dried the raw ore at about 500° F. From the dryer, the ore was fed into a forced draft, oxygen fed, horizontal rotary furnace, which was rotating at about 15 r.p.m. and about 1400° F. The ore was allowed to remain in the furnace for about 30 seconds. The ore was then removed from the furnace, forced air cooled to 250° F., screened and bagged. The activated ore, which then had a greatly reduced organic content, a greatly increased surface area and pore structure, and a greatly reduced bulk density, was then screened through a 30-mesh screen and onto a 50-mesh screen. Analysis of the ore at this point revealed the following composition:

| Component: | Percent by wt. |
| --- | --- |
| Silicon dioxide | 45.33 |
| Ferric oxide | 9.44 |
| Aluminum oxide | 9.71 |
| Calcium oxide | 11.96 |
| Magnesium oxide | 17.47 |
| Loss on ignition due to organics and moisture | 6.09 |
| Total | 100.00 |

8.0 grams of the activated filler material were thoroughly dried and then mixed thoroughly with 25.0 grams of a polyether-based polyurethane prepolymer sold under the trademark Isofoam L-128, in a continuous agitator at 50° F. and 30 percent relative humidity. The agitated, viscous material was metered through a Newton-type mixing machine where it was blended with 0.725 gram catalyst, catalyst 11 heated to about 105° F. Both Isofoam L-128 and catalyst 11 may be obtained from Isocyante Products Co., Wilmington 99, Del. The blended material was then allowed to flow into a mold which had been preheated to about 120° F., and which had been treated with Teflon mold release agent. At a pressure of one atmosphere, the material was allowed to remain for 10–15 minutes. The material was then post-cured for 3 hours at 250° F. The resulting flexible foam product was found to have excellent characteristics such as interconnecting and unicellular cell structure, uniformity of distribution of filler, low K value, excellent resistance to oxidation, solvents, bacteria, and fungus. The material was found to be useful, for example, as acoustical insulation, as a filtering medium, and as a plant growth medium.

EXAMPLE 2

The process described in Example 1 was followed except that the cooled processed ore was screened through a 100 mesh screen, and onto a 200 mesh screen, whereupon an analysis showed the following composition of the ore.

| Component: | Percent by wt. |
| --- | --- |
| Silicon dioxide | 39.66 |
| Ferric oxide | 10.65 |
| Aluminum oxide | 14.97 |
| Calcium oxide | 11.80 |
| Magnesium oxide | 17.51 |
| Loss on ignition due to organics and moisture | 5.41 |
| Total | 100.00 |

The filler was then loaded into the foam in the manner described in Example 1, with excellent results.

EXAMPLE 3

The process described in Example 1 was followed except that the cooled processed ore was screened through an 8-mesh screen, and onto a 16-mesh screen, whereupon an analysis showed the following composition of the ore.

| Component: | Percent by wt. |
| --- | --- |
| Silicon oxide | 29.98 |
| Ferric oxide | 13.09 |
| Aluminum oxide | 19.69 |
| Calcium oxide | 16.27 |
| Magnesium oxide | 20.82 |
| Loss of ignition due to moisture and organics | 0.15 |
| Total | 100.00 |

The filler was then loaded into the ore in the manner described in Example 1. The resulting material was useful as acoustical insulation and as an abrasive cleaning sponge. It was noted that the filler material was not so evenly distributed as it was in the products of Examples 1 and 2.

EXAMPLE 4

Eight grams of the same sample of the activated filler material which had been used in Example 1 was thoroughly dried and added to 0.725 gram of catalyst 11. This mixture was added to 25.0 grams Osofoam L-128 (which had been preheated to 105° F.) in a Newton-type mixing machine. From the mixing nozzle of the mixing machine, the material flowed into a mold which had been preheated to 120° F. and which had been treated with Teflon as a mold release agent. After allowing the material in the mold to cool for about 10–15 minutes at 25 p.s.i.g., the product was removed from the mold and was found to have excellent properties, viz unicellular and interconnecting cell structure, low K value, uniform loading of the filler, dielectric, and resistivity to fungus, bacteria, solvents, and oxidation. The material was useful as acoustical insulation and as a plant growth medium.

EXAMPLE 5

Example 1 was followed except the following amounts of filler, prepolymer and catalyst were used:

50.0 grams prepolymer
14.0 grams filler
1.5 grams catalyst

Again the results were excellent, with the products having the same characteristics and advantageous uses enumerated in Example 1.

EXAMPLE 6

Example 1 was again followed except the following amounts of reactants were employed:

25.0 grams prepolymer Isofoam L–128
0.625 gram catalyst-21
10.0 grams activated filler The resulting products were once again highly satisfactory, having the advantageous characteristics and properties described in Example 1.

EXAMPLE 7

To 2000 pounds of the cooled activated filler prepared in accordance with Example 1, was added $\frac{1}{16}$ ounce of Fertosan Myco bacteria in the following manner: The bacteria were first added to 5 ounces of pure, chlorine-free water (not distilled) which had been preheated to 150° F., and thoroughly mixed therewith. The bacteria loaded concentrate was then thoroughly mixed with 24 gallons of pure warm water. The activated filler was then placed in an open non-ferrous vessel and the 24 gallons of activated bacteria solution added slowly in such a manner as to facilitate complete and thorough blending, and the mixture in the vessel was agitated for 12 hours. The vessel was then closed and the pressure in the vessel reduced to 50 mm. mercury. The mixture in the tank was kept at a temperature of about 100° F. until all moisture except about 10.42 weight percent had been removed.

Eight grams of the thoroughly mixed material was then added to 25.0 grams of prepolymer, Isofoam L–128 in the manner described in Example 1. The procedure of Example 1 was followed, the composite mixture being molded in small 4-inch pots and the pots post-cured for 24 hours at 100° F. The resulting product was excellent as a plant growth medium; an African violet plant rooted in the molded pot was sustained over a long period of time with periodic watering the only necessary plant care, the water being added at the bottom of the pot. The root structure of the plant, foliage and blooms were found to be excellent, and the plant was not destroyed even by relatively long periods of frost.

EXAMPLE 8

To 2000 pounds of the activated filler of Example 1 was added $\frac{1}{16}$ ounce Fertosan Myco and 1 ounce Fertosan Compost Concentrate, the bacteria and concentrate being added in the manner described in Example 7 for the addition of bacteria. Eight grams of the thoroughly mixed filler was then added to 25.0 grams of prepolymer Isofoam L–128 in the manner described in Example 1. The procedure of Example 1 was then followed and the reacted material poured into small 3-inch pot molds and the pots post-cured for 24 hours at 100° F. The resulting product was found to be an excellent plant growth medium. African violet plants were found to survive in the pots for at least one year, the only care required being periodic watering. The rate of growth of the plants in the pots of this example was considerably greater than the rate of growth of the plants in the product of Example 7, and the plants also had more leaf color with more and larger blooms.

EXAMPLE 9

The method of Example 1 was followed except that, instead of adding 8 grams of Micolite, 4 grams of Micolite were mixed with 4 grams of perlite, and the mixture added to the prepolymer as described in Example 1. Excellent results were obtained, and it was found that the resultant product was useful as a plant growth medium when impregnated with bacteria, and was particularly useful for those plants which require an excessive amount of water.

EXAMPLE 10

The method of Example 1 was again followed, with the exception that 8 grams of perlite, rather than 8 grams of Micolite, was added to the prepolymer. The results were found to be excellent when an impregnating foam of certain properties was desired. The material was useful, when impregnated with bacteria and algae, as a plant-growth medium for water-loving plants.

EXAMPLE 11

Example 1 was followed except that 8 grams of vermiculite was substituted for the 8 grams of Micolite used in Example 1. Results were satisfactory, but the resulting product was found to have inadequate pore structure to be particularly useful as a plant growth medium.

EXAMPLE 12

Example 1 was once again followed with the exception that 8 grams of biotite were substituted for the 8 grams of Micolite used in Example 1. The results were comparable to those obtained in Example 11.

EXAMPLE 13

8.2 grams Micolite processed in the manner of Example 1 were added to 9.83 grams Isofoam L–160, a polyether-based prepolymer obtained from Isocyanate Products Co., and to the mixture 1.97 grams of catalyst D–1536, also obtained from Isocyanate Products Co., was added in the manner described in Example 1, except that the agitator temperature was 65° F. The physical properties of the foam produced according to this example were not as desirable as the corresponding properties of the foam of Example 1; however, the foam of this example was useful for some purposes such as a plant-growth medium.

EXAMPLE 14

1.52 grams Micolite was added to 3.1 grams catalyst D–1536 at ambient temperature, and to the mixture was added 14.4 grams Isofoam L–160 in the manner described in Example 4. Once again the foam material was satisfactory, but the physical properties were not so advantageous as those of the foam made in Example 1. The product was useful as a plant-growth medium.

EXAMPLE 15

5 grams of Micolite processed in the manner of Example 1 were added to 14 grams of a polyester-based prepolymer prepared from 40 parts by weight toluene diisocyanate and 100 parts by weight of a linear polyester, Laminac Resin #4134. The mixture was added to 1 gram of a water-carboxylic acid catalyst in the manner described in Example 1. While the mineral distribution in the resulting product was good, the cellular structure of the foam was found to be inadequate for use as a plant growth medium. The material was useful for other purposes, however, such as acoustical insulation.

We claim:
1. A plant growth medium suitable for use as a matrix material to support the root structure of a living plant, to promote maximum growth and development of the plant while protecting the root structure of the plant from invasion by foreign bodies, comprising:
   a flexible synthetic polymeric material; and,
   a plurality of finely divided particles of filler material embedded in said polymeric material, said filler material consisting of a mixture of
      a highly-porous mineral ore material having a low thermal conductivity; and,
      microorganisms comprising molds, fungi, bacteria, and intermediaries thereof, suitable for rendering said mineral ore material adaptable for use by said plant,
said plant growth medium containing at least about 5% by weight of said filler material.

2. The plant growth medium in acordance with claim 1, wherein said filler material additionally includes a seaweed concentrate, said seaweed concentrate providing additional vitamin and mineral supplements for said plant.

3. The plant growth medium in accordance with claim 1, wherein said mineral ore material comprises oxides of aluminum, calcium, iron, magnesium, and silicon.

4. The plant growth medium in accordance with claim 1, wherein said microorganisms comprise ascomycetes, actinomycetes, basidomycetes, fungi imperfecti, nitrogen fixing bacteria, and zygomcetes.

5. A method of making a material useful as a plant growth medium and in insulation, filtering and abrasion applications, comprising:
blending a plurality of finely divided particles of an activated, bloated, highly-porous mineral ore material into a prepolymer of synthetic polymeric material, said synthetic polymeric material being suitable for being formed into a flexible foam having an interconnecting and substantially uniform cell structure, to form a mixture; and,
adding an aqueous catalyst to said mixture to foam said prepolymer, whereupon said mineral ore particles become embedded in said foam, thus forming a mineral impregnated foam product.

6. The method in accordance with claim 5, wherein said mineral ore material comprises oxides of aluminum, calcium, iron, magnesium and silicon.

7. The method in accordance with claim 5, wherein about 15 parts to about 35 parts by weight of mineral ore material is blended with about 60 parts to about 85 parts by weight of prepolymer, and said catalyst is added in an amount of about ½ part to about 2 parts by weight.

8. A method of making a plant growth medium suitable for use as a matrix material to support the root structure of a living plant, to promote maximum growth and development of the plant while protecting the root structure of the plant from invasion by foreign bodies, comprising:

mixing microorganisms comprising molds, fungi, bacteria, and intermediaries thereof, suitable for rendering mineral ore material adaptable for use by said plant, with a plurality of finely divided particles of an activated, bloated, highly-porous mineral ore material and a seaweed concentrate providing additional vitamin and mineral supplement for said plant to form a first mixture;
blending said first mixture into a prepolymer of synthetic polymeric material, said synthetic polymeric material being suitable for being formed into a flexible foam having an interconnecting and substantially uniform cell structure, to form a second mixture; and,
adding an aqueous catalyst to said second mixture to foam said prepolymer to form a foam product whereupon said mineral ore particles and microorganisms become embedded in said foam product.

References Cited

UNITED STATES PATENTS

| | | | |
|---|---|---|---|
| 947,798 | 2/1910 | Coates | 71—6 |
| 2,988,441 | 6/1961 | Pruitt | 71—1 |
| 3,072,584 | 1/1963 | Karpovich. | |
| 3,150,109 | 9/1964 | Ferrigno. | |
| 3,245,776 | 4/1966 | Rubin | 71—1 |

S. LEON BASHORE, Primary Examiner

T. G. FERRIS, Assistant Examiner

U.S. Cl. X.R.

71—6, 64; 195—54, 56; 161—190